US010882292B2

(12) United States Patent
Mazich et al.

(10) Patent No.: US 10,882,292 B2
(45) Date of Patent: Jan. 5, 2021

(54) HEAT BONDING OF LOW ENERGY SURFACE SUBSTRATES

(71) Applicant: Zephyros, Inc., Romeo, MI (US)

(72) Inventors: Kenneth A. Mazich, Birmingham, MI (US); Jeffrey R. Apfel, Shelby Township, MI (US); Kenneth S. Makuch, Swartz Creek, MI (US)

(73) Assignee: ZEPHYROS, INC., Romeo, MI (US)

( * ) Notice: Subject to any disclaimer, the term of this patent is extended or adjusted under 35 U.S.C. 154(b) by 84 days.

(21) Appl. No.: 15/740,202

(22) PCT Filed: Jul. 6, 2016

(86) PCT No.: PCT/US2016/041143
§ 371 (c)(1),
(2) Date: Dec. 27, 2017

(87) PCT Pub. No.: WO2017/007823
PCT Pub. Date: Jan. 12, 2017

(65) Prior Publication Data
US 2018/0186141 A1    Jul. 5, 2018

Related U.S. Application Data

(60) Provisional application No. 62/188,865, filed on Jul. 6, 2015.

(51) Int. Cl.
*B29C 65/00*   (2006.01)
*B32B 37/12*   (2006.01)
*B32B 27/32*   (2006.01)
*B32B 5/02*    (2006.01)
*B32B 5/20*    (2006.01)
*B32B 7/12*    (2006.01)
*B32B 27/06*   (2006.01)
*B32B 27/08*   (2006.01)
*B32B 27/12*   (2006.01)
*B32B 27/38*   (2006.01)
*B32B 27/26*   (2006.01)
*B32B 5/24*    (2006.01)
*C09J 5/06*    (2006.01)
*B32B 27/16*   (2006.01)
*B32B 37/14*   (2006.01)
(Continued)

(52) U.S. Cl.
CPC .............. *B32B 37/12* (2013.01); *B32B 5/024* (2013.01); *B32B 5/20* (2013.01); *B32B 5/245* (2013.01); *B32B 7/12* (2013.01); *B32B 27/065* (2013.01); *B32B 27/08* (2013.01); *B32B 27/12* (2013.01); *B32B 27/16* (2013.01); *B32B 27/26* (2013.01); *B32B 27/32* (2013.01); *B32B 27/38* (2013.01); *B32B 37/14* (2013.01); *C09J 1/00* (2013.01); *C09J 5/06* (2013.01); *B29C 65/04* (2013.01); *B29C 65/1403* (2013.01); *B29C 65/32* (2013.01); *B29C 65/46* (2013.01); *B29C 65/489* (2013.01); *B29C 65/4815* (2013.01); *B29C 65/4835* (2013.01); *B32B 2038/0084* (2013.01); *B32B 2262/02* (2013.01); *B32B 2264/105* (2013.01); *B32B 2307/30* (2013.01); *B32B 2307/546* (2013.01); *B32B 2307/558* (2013.01); *B32B 2309/02* (2013.01); *B32B 2310/0812* (2013.01); *B32B 2310/0868* (2013.01); *B32B 2311/30* (2013.01); *B32B 2605/003* (2013.01); *B32B 2607/00* (2013.01); *C09J 2301/416* (2020.08); *C09J 2423/04* (2013.01); *C09J 2423/10* (2013.01)

(58) Field of Classification Search
CPC ..... B29C 65/04; B29C 65/1403; B29C 65/32; B29C 65/46; B29C 65/4815; B29C 65/4835; B29C 65/489
USPC ........... 156/78, 79, 155, 272.2, 275.5, 307.3
See application file for complete search history.

(56) References Cited

U.S. PATENT DOCUMENTS 3,620,875 A * 11/1971 Guglielmo, Sr. ... B29C 65/1425
                                                156/272.4
5,958,173 A *  9/1999 Hibble ................. B01D 25/176
                                                156/272.4
(Continued)

FOREIGN PATENT DOCUMENTS

CN    1290314 A    4/2001
CN    1798820 A    7/2006
(Continued)

OTHER PUBLICATIONS

PCT International Search Report & Written Opinion dated Sep. 28, 2016; Application No. PCT/US2015/041143.
(Continued)

Primary Examiner — Mark A Osele
Assistant Examiner — Nickolas R Harm
(74) Attorney, Agent, or Firm — The Dobrusin Law Firm, P.C.

(57) ABSTRACT

A method comprising providing a polymeric substrate having a melting point of from about 130° C. to about 190° C., and locating a material layer onto the substrate, wherein the material layer comprises one or more polymeric materials that liquefy upon exposure to temperatures of at least about 100° C., to blend with a softened portion of the polymeric substrate. Upon exposure of one or more of the substrate and the material layer to a stimulus, the temperature is increased in a predetermined temperature zone of one or more of the substrate and material layer to cause blending of the one or more polymeric materials of the material layer with the softened portion of the polymeric substrate.

19 Claims, No Drawings

(51) Int. Cl.
*C09J 1/00* (2006.01)
*B32B 38/00* (2006.01)
*B29C 65/04* (2006.01)
*B29C 65/32* (2006.01)
*B29C 65/46* (2006.01)
*B29C 65/48* (2006.01)
*B29C 65/14* (2006.01)

(56) References Cited

U.S. PATENT DOCUMENTS

| | | | | |
|---|---|---|---|---|
| 6,300,415 | B1 * | 10/2001 | Okayama | B32B 27/32 |
| | | | | 525/191 |
| 7,147,742 | B2 * | 12/2006 | Kirsten | B29C 35/08 |
| | | | | 156/272.2 |
| 8,652,290 | B2 * | 2/2014 | Haverty | B29C 55/30 |
| | | | | 156/164 |
| 2004/0084139 | A1 | 5/2004 | Boss | |
| 2008/0029214 | A1 | 2/2008 | Hable et al. | |
| 2012/0258288 | A1 | 10/2012 | Fischer et al. | |

FOREIGN PATENT DOCUMENTS

| | | |
|---|---|---|
| CN | 101772532 A | 7/2010 |
| CN | 102947403 A | 2/2013 |
| EP | 1884533 A2 | 6/2008 |
| EP | 2740778 A1 | 11/2014 |
| WO | 2014/058454 A1 | 4/2014 |
| WO | 2014/075695 A1 | 5/2014 |

OTHER PUBLICATIONS

Chinese First Office Action dated Jun. 20, 2019, Application No. CN201680038637.7.

* cited by examiner

HEAT BONDING OF LOW ENERGY SURFACE SUBSTRATES

FIELD

The present teachings relate to a method and associated adhesives for adhering polymeric substrates including locating a material layer onto the substrate, wherein the material layer comprises one or more polymeric materials that liquefy upon exposure to temperatures of at least about 100° C., so that upon exposure to certain increased temperatures the polymeric substrates soften and blend with the material layer.

BACKGROUND

Efforts to reduce the weight of most modes of transportation has led to an increased use of polymeric materials throughout transportation vehicles. The adhesion of these polymeric materials has been a continued challenge. Whether adhering two polymeric materials to one another or adhering a polymeric material to a dissimilar non-polymeric material, sufficient adherence can be challenging as can the timing of adhering and curing. Quite often, heat activated adhesives are utilized in multiple locations throughout the vehicles. These heat activated adhesives are formulated to adhere and cure during exposure to temperatures in a paint bake oven. However, there are a number of locations within a vehicle where the adhesive must adhere and/or cure outside of the paint bake cycle. In order to accommodate the timing challenges and the difficulty in adhering to polymeric materials, welding processes are often utilized which are both time consuming and labor intensive.

Thus, what is needed is an adhesive and adhering process that is outside of the typical paint bake cycle while also allowing for high strength adhesion between two polymeric substrates and/or a polymeric substrate and a second dissimilar substrate.

SUMMARY

The teachings herein relate to adhering polymeric substrates with the use of an adhesive including a metallic filler whereby upon exposure to increased temperatures, a portion of the polymeric substrate softens and at least a portion of the adhesive liquefies to blend with the softened portion of the polymeric substrate.

The teachings further envision a method comprising providing a polymeric substrate, wherein the substrate has a melting point of from about 130° C. to about 190° C. and locating a material layer onto the substrate, wherein the material layer comprises one or more polymeric materials that liquefy upon exposure to temperatures of at least about 100° C., to blend with a softened portion of the polymeric substrate. The method may further include exposing one or more of the substrate and the material layer to a stimulus so that the temperature is increased in a predetermined zone of one or more of the substrate and material layer to cause blending of the one or more polymeric materials of the material layer with the softened portion of the polymeric substrate. The material layer may comprise or consist of an adhesive material. The material layer and polymeric substrate may be selected such that they have similar melt temperatures. The melt temperature of each of the polymeric substrate and material layer may be greater than 80° C. The melt temperature of each of the polymeric substrate and material layer may be greater than 90° C. The melt temperature of each of the polymeric substrate and material layer may be greater than 100° C. The melt temperature of each of the polymeric substrate and material layer may be greater than 120° C.

The stimulus may comprise a radiofrequency field. The material layer may comprise one or more of an ethylene component and a propylene component. The stimulus may activate a component of the material layer. The material layer may include a metallic filler. The stimulus may activate the metallic filler. The metallic filler may comprise manganese zinc ferrite. The metallic filler may comprise iron ferrite. The metallic filler may comprise an iron powder. The polymeric substrate may be a thermoplastic. The polymeric substrate may comprise polypropylene. The material layer may have adhesive properties. The polymeric substrate may be adhered to a second polymeric substrate via the material layer. The material layer may be a film. The material layer may be located in between an adhesive layer and the polymeric substrate. The polymeric substrate may be an interior transportation vehicle panel. The material layer may form a foam upon exposure to the stimulus. The material layer may contact an adhesive that forms a foam layer upon exposure to the stimulus. The polymeric substrate may include a metal component. The material layer may comprise a polymer component and an epoxy component, whereby the polymer component blends with the polymeric substrate but the epoxy component does not. The polymeric substrate may comprise polypropylene and the material layer comprises one or more of an ethylene component, whereby the ethylene component liquefies upon exposure to the stimulus to blend with the polypropylene of the polymeric substrate. The metallic filler may include nickel. The metallic filler may include a combination of one or more of manganese zinc ferrite, iron ferrite, or nickel. The material layer may be formed as a mesh. The material layer may be a flexible layer. The material layer may include a filler present in an amount of at least about 20% by weight of the material layer. The material layer may include a filler present in an amount of at least about 30% by weight of the material layer. The material layer may include a filler present in an amount of at least about 40% by weight of the material layer.

DETAILED DESCRIPTION

The explanations and illustrations presented herein are intended to acquaint others skilled in the art with the invention, its principles, and its practical application. Accordingly, the specific embodiments of the present disclosure as set forth are not intended as being exhaustive or limiting. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. application Ser. No. 62/188,865, filed Jul. 6, 2015, the contents of that application being hereby incorporated by reference herein for all purposes.

The teachings herein relate to a method of adhering polymeric substrate materials which avoids the need for welding steps. The polymeric materials for adhering may be a polyamide, a polyolefin (e.g., polyethylene, polypropylene, or otherwise), a polycarbonate, a polyester (e.g., polyethylene terephthalate), an epoxy based material, a thermoplastic polyurethane, or any combination thereof. A preferred polymeric substrate material may be a polypropylene material. The adhesive (e.g., material layer) utilized to bond the polymeric substrates may be a foamable adhesive. The adhesive may foam, cure or any combination thereof, upon exposure to a stimulus. Such stimuli may include heat (which may be applied by induction heating), light, electricity, pressure, cooling, moisture and the like. Curing, as used herein, generally denotes any stiffening, hardening, solidifying or the like of the adhesive material.

In order to effectively bond the adhesive material to the polymeric substrate, it is possible that a portion of the adhesive is blending with a portion of the polymeric substrate. More specifically, upon activating the adhesive, the adhesive may start to soften and/or liquefy and may blend with a softened portion of the polymeric substrate. It is possible that a specific component of the adhesive may be particularly prone to liquefying and blending with the polymeric substrate. In one example, the adhesive includes an ethylene component which, upon activation of the adhesive, may liquefy and blend with a portion of the polymeric substrate. The polymeric substrate may also include a material that is likely to soften and blend with a corresponding polymer component of the adhesive. Such material may be a polymeric material. In one specific example, the polymeric substrate includes a polypropylene component that softens and blends with a component of the adhesive, which may be an ethylene component as described above.

The requisite stimulus can be applied to a selected area of the adhesive, the substrate, or any combination thereof. It is thus possible that softening occurs along the entirety of the polymeric substrate or along only a portion of the substrate. It may be such that the stimulus can be selectively applied to a small area on the substrate that is in contact with a portion of the adhesive. In one example, a magnetic field at either radio frequency or medium frequency range may be applied to one or more of the adhesive or the polymeric substrate. The magnetic field may act to heat the materials by induction heating. The stimulus may be applied to one or more of a first polymeric substrate, an adhesive, or a second polymeric substrate (which is adhered to the first polymeric substrate by the adhesive).

As a result, it is possible that one or more of the adhesive or polymeric substrate may include a metallic filler material that assists in heating the material. Such metallic filler material may include any suitable metallic filler, but may specifically include one or any combination of nickel, ferrite, zinc, manganese, or iron. The metallic filler may comprise a significant portion of the adhesive. The magnetic filler may be present in amount of at least 10% by weight of the total adhesive. The magnetic filler may be present in amount of at least 20% by weight of the total adhesive. The magnetic filler may be present in amount of at least 30% by weight of the total adhesive. The magnetic filler may be present in amount of at least 40% by weight of the total adhesive. The magnetic filler may be present in amount of less than 80% by weight of the total adhesive. The magnetic filler may be present in amount of less than 60% by weight of the total adhesive. The magnetic filler may be present in amount of less than 50% by weight of the total adhesive.

The form of the adhesive may vary depending upon the needs of the application. The form of the adhesive may be selected so that the thickness of the adhesive upon activation is relatively uniform. The form of the adhesive may be selected so that read-through on a substrate surface (which may be a class A surface) is minimized or substantially eliminated. The adhesive may be formed as a film. The adhesive may be formed as a mesh. The adhesive may be substantially flexible such that it can be applied onto a curved substrate. The adhesive may be dry to the touch or may be tacky. A tacky adhesive may include a handling layer or surface treatment so that the adhesive can be easily handled during application to one or more substrates.

The adhesive material will typically include one or more polymers including copolymers and terpolymers which can include a variety of different polymers, such as plastics, thermoplastics, elastomers, thermosets, thermosettables, combinations thereof or the like. For example, and without limitation, polymers that might be appropriately incorporated into the polymeric admixture include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyimide, polyimide, polyisobutylene, polyacrylonitrile, poly (vinyl chloride), poly(methyl methacrylate), poly(vinyl acetate), poly(vinylidene chloride), polytetrafluoroethylene, polyisoprene, polyacrylamide, polyacrylic acid, polymethacrylate. The adhesive may include one or more of an acetate (e.g. ethylene vinyl acetate), an acrylate and/or a methacrylate (e.g., a copolymer of butyl acrylate and/or methyl acrylate), and an epoxy/elastomer adduct. For example, and without limitation, the adhesive may also be an EVA based material, including an ethylene copolymer or terpolymer that may possess an alpha-olefin. As a copolymer or terpolymer, the polymer may be composed of two or three different monomers, i.e., small molecules with high chemical reactivity that are capable of linking up with similar molecules. In one embodiment the adhesive includes an ethylene copolymer, a copolymer of ethylene and butyl acrylate, or some combination thereof.

When used, these polymers can comprises a small portion or a more substantial portion of the adhesive material (e.g., up to 85% by weight or greater). Preferably, the one or more polymers comprises about 0.1% to about 50%, more preferably about 20% to about 40% and even more preferably about 25% to about 35% by weight of the adhesive material.

The adhesive material may also include an adhesion promoter, including but not limited to epoxy materials, acrylates, hydrocarbon resins or the like. The adhesion promotor may be present in an amount of at least about 2% by weight, at least about 5% by weight or even at least about 9% by weight. The adhesion promotor may be present in an amount of less than about 20% by weight, less than about 15% by weight or even at least about 10% by weight.

One or more curing agents and/or curing agent accelerators may be added to the adhesive material. Amounts of curing agents and curing agent accelerators can vary widely within the material composition depending upon the type of cellular structure desired, the desired amount of expansion of the adhesive material (if any), the desired rate of expansion, the desired structural properties of the adhesive material, the desired cure conditions (e.g., manufacturing conditions) and the like. Exemplary ranges for the curing agents or curing agent accelerators present in the material composition may range from about 0.01% to about 50% by weight, or even 1% by weight to about 20% by weight.

Examples of suitable curing agents include peroxide curing and/or crosslinking agents. Other suitable curing agents may include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), or mixtures thereof. Particular curing agents include modified and unmodified polyamines or polyamides such as triethylenetetramine, diethylenetriamine tetraethylenepentamine, cyanoguanidine, dicyandiamides and the like. Another possible curing agent is dihydrazides, particularly isophthalic dihydrazide. An accelerator for the curing agents (e.g., a modified or unmodified urea such as methylene diphenyl bis urea, an imidazole or a combination thereof) may also be provided for preparing the adhesive. Another possible accelerator for curing agents is dipentaerythritol pentaacrylate (SR-399).

One or more blowing agents may be added to the adhesive material for producing inert gasses that form, as desired, an open and/or closed cellular structure within the activatable material. In this manner, it may be possible to lower the density of articles fabricated from the material. In addition, the material expansion can help to improve seating capability, acoustic damping or both.

The blowing agent may include one or more nitrogen containing groups such as amides, amines and the like. Examples of suitable blowing agents include azodicarbonamide, dinitrosopentamethylenetetramine, 4,4.sub.i-oxy-bis-(benzenesulphonylhydrazide), trihydrazinotriazine and N,N.sub.i-dimethyl-N,N.sub.i-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

The adhesive material may also include one or more fillers. Preferably the filler includes a material that is generally non-reactive with the other components present in the adhesive material. While the fillers may generally be present within the adhesive material to take up space at a relatively low weight, it is contemplated that the fillers may also impart properties such as strength and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one embodiment, one or more mineral or stone type fillers such as calcium carbonate, sodium carbonate or the like may be used as fillers. In another preferred embodiment, silicate minerals such as mica may be used as fillers.

When employed, the fillers in the activatable material can range from 10% or less to 90% or greater by weight of the activatable material, but more typical from about 20 to 55% by weight of the activatable material. According to some embodiments, the activatable material may include from about 0% to about 3% by weight, and more preferably slightly less than 1% by weight clays or similar fillers. Powdered (e.g. about 0.01 to about 50, and more preferably about 1 to 25 micron mean particle diameter) mineral type filler can comprise between about 1% and 70% by weight, more preferably about 5% to about 20% by weight.

The following examples listed at Table 1 are provided to illustrate the invention, but are not intended to limit the scope thereof. All parts and percentages are by weight unless otherwise indicated.

TABLE 1

| Component | Ex 1 Wt[1] | Ex 2 Wt[1] |
|---|---|---|
| Copolymer of ethylene and butyl acrylate | 17.40 | 17.40 |
| EVA copolymer | 13.80 | 13.80 |
| Reactive elastomeric terpolymer | 3.60 | 3.60 |
| Hydrocarbon resin | 9.60 | 9.60 |
| Dipentaerythritol pentaacrylate | 0.36 | 0.36 |
| Peroxide crosslinking agent | 0.90 | 0.90 |
| Peroxide curing agent | 0.12 | 0.12 |
| Dicyandiamide curing agent | 0.06 | 0.06 |
| Zinc oxide | 1.80 | 1.80 |
| Azodicarbonamide | 5.70 | 5.70 |
| Carbon black | 0.06 | 0.06 |
| Calcium carbonate | 6.60 | 6.60 |
| Manganese zinc ferrite | 40.0 | 0 |
| Iron powder | 0 | 40.0 |

Though the teachings herein describe material layers (e.g., adhesive layers) and polymeric substrates, it is possible that additional layers may be utilized including additional substrate and adhesive layers. These additional layers may provide additional strength, reinforcement, adhesion, support or the like.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A method comprising:
providing a polymeric substrate, wherein the polymeric substrate has a melting point of from about 130° C. to about 190° C.;
locating a material layer onto the polymeric substrate, wherein the material layer comprises one or more polymeric materials that liquefy upon exposure to temperatures of at least about 100° C., to blend with a softened portion of the polymeric substrate;
exposing one or more of the polymeric substrate and the material layer to a stimulus so that a temperature is increased in a predetermined temperature zone of the one or more of the polymeric substrate and the material layer to cause blending of the one or more polymeric materials of the material layer with the softened portion of the polymeric substrate; and
wherein the material layer forms a foam upon exposure to the stimulus.

2. The method of claim 1, wherein the stimulus comprises an electromagnetic field in a radio frequency or a medium frequency current.

3. The method of claim 1, wherein the material layer comprises one or more of an ethylene component and a propylene component.

4. The method of claim 3, wherein the stimulus activates the one or more of the ethylene component and the propylene component of the material layer.

5. The method of claim 3, wherein the material layer includes a metallic filler.

6. The method of claim 5, wherein the stimulus activates the metallic filler.

7. The method of claim 5, wherein the metallic filler includes a combination of one or more of manganese zinc ferrite, iron ferrite, or nickel.

8. The method of claim 7, wherein the metallic filler comprises manganese zinc ferrite.

9. The method of claim 7, wherein the metallic filler comprises iron ferrite.

10. The method of claim 3, wherein the material layer has adhesive properties.

11. The method of claim 3, wherein the material layer is located in between an adhesive layer and the polymeric substrate.

12. The method of claim 3, wherein the material layer comprises a polymer component and an epoxy component, whereby the polymer component blends with the polymeric substrate but the epoxy component does not.

13. The method of claim 3, wherein the material layer is formed as a mesh.

14. The method of claim 1, wherein the polymeric substrate comprises polypropylene.

15. The method of claim 1, wherein the polymeric substrate is adhered to a second polymeric substrate via the material layer.

16. The method of claim 1, wherein the material layer is a film.

17. The method of claim 1, wherein the material layer contacts an adhesive layer that forms a foam layer upon exposure to the stimulus.

18. The method of claim 1, wherein the polymeric substrate comprises polypropylene and the material layer comprises one or more of an ethylene component, whereby the one or more of the ethylene component liquefies upon exposure to the stimulus to blend with the polypropylene of the polymeric substrate.

19. The method of claim 18, wherein the material layer includes a filler present in an amount of at least about 20% by weight of the material layer.

* * * * *